(12) United States Patent
Krauth et al.

(10) Patent No.: US 8,013,491 B2
(45) Date of Patent: Sep. 6, 2011

(54) STATOR FOR AN ELECTRIC DRIVE MOTOR

(75) Inventors: Wolfgang Krauth, Achern-Sasbachried (DE); Eike Hermann Timm, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 12/376,597

(22) PCT Filed: Aug. 2, 2007

(86) PCT No.: PCT/EP2007/058023
§ 371 (c)(1),
(2), (4) Date: Feb. 6, 2009

(87) PCT Pub. No.: WO2008/019954
PCT Pub. Date: Feb. 21, 2008

(65) Prior Publication Data
US 2010/0181862 A1   Jul. 22, 2010

(30) Foreign Application Priority Data

Aug. 15, 2006 (DE) .......................... 10 2006 038 327
Mar. 22, 2007 (DE) .......................... 10 2007 013 680

(51) Int. Cl.
*H02K 1/00* (2006.01)
(52) U.S. Cl. ..................... 310/198; 310/184; 310/216.37
(58) Field of Classification Search .................. 310/187, 310/179, 184, 198, 216.35–216.37
See application file for complete search history.

(56) References Cited

U.S. PATENT DOCUMENTS

| 4,038,575 A | 7/1977 | Nordebo |
| 4,260,925 A | 4/1981 | Barrett |
| 4,591,766 A | 5/1986 | Takaba |
| 4,935,653 A | 6/1990 | Cheng |
| 7,812,497 B2 * | 10/2010 | Sugishima et al. ........... 310/195 |

FOREIGN PATENT DOCUMENTS

| DE | 19838335 | 3/2000 |
| DE | 202006002279 U1 | 4/2006 |
| GB | 1543150 A | 3/1979 |
| JP | 59222051 A | 12/1984 |
| JP | 5022912 A | 1/1993 |
| JP | 7075306 A | 3/1995 |
| WO | 0011775 A1 | 3/2000 |

OTHER PUBLICATIONS

PCT/EP2007/058023 International Search Report.
Mehta, Vin, "How to drop the ceiling on fan noise," Machine Design, Oct. 24, 1991, pp. 103-106.
Vin Mehta: "How to Drop the Ceiling on Fan Noise," Machine Design, Oct. 24, 1991, pp. 103-106, Bd. 63, Nr. 21, XP000274101, Penton Media, Cleveland, Ohio.

\* cited by examiner

*Primary Examiner* — Thanh Lam
(74) *Attorney, Agent, or Firm* — Michael Best & Friedrich LLP

(57) ABSTRACT

The invention relates to a stator (1) for an electric drive motor having a number of stator teeth separated by grooves, wherein the stator teeth are wound by a multi-strand winding, and wherein one strand comprises several coils (5, 6), and wherein individual coils (5) each comprise multiple stator teeth, and preferably multiple stator teeth are combined at the height of their tooth necks into a collective stator tooth (4) having a tooth base (3) and multiple tooth heads (2), characterized in that two stator teeth each are combined into a collective stator tooth (4).

15 Claims, 5 Drawing Sheets

… … …

STATOR FOR AN ELECTRIC DRIVE MOTOR

BACKGROUND AND SUMMARY OF INVENTION

The invention relates to a stator for an electric drive motor having a number of stator teeth which are separated by slots and having a multiple-section winding, with one section comprising a plurality of coils and with individual coils each surrounding a plurality or teeth. Slotted stators for electric drive motors having a number of symmetrical stator teeth and a multiple-section three-phase winding are known.

One example of a known stator is described in German patent application DE 198 38 335 A1. The stator described in the cited document has a number of stator teeth, which are separated by slots, and a multiple-section winding, which in particular may be in the form of a three-phase winding. In this case, one section comprises a plurality of coils and individual coils each surround a plurality of teeth, with a plurality of stator teeth in each case being combined to form one stator tooth with a plurality of tooth heads.

As is known, the efficiency of a stator is governed essentially by its slot filling, that is to say the total conductor cross section with respect to the total area of the stator.

The stator according to the invention for an electric drive motor has a number of stator teeth separated by slots; in this case, the stator teeth have a multiple-section winding wound around them. A section comprises a plurality of coils, and individual coils each surround a plurality of teeth. In this case, two teeth are in each case combined at the level of their tooth neck to form a combined stator tooth. The advantage of this measure according to the invention is better utilization of the physical volume by a novel arrangement of the winding area created by the described configuration of the stator teeth, while ensuring that the stator according to the invention can be wound using the existing winding technologies (flyer, pull-in, bar and needle-winding techniques). This measure leads to an improvement in performance and to a reduction in the size of the electric motor equipped with the stator according to the invention, thus making it possible to save material and to achieve a better power-density/cost ratio.

One advantageous variant of the invention consists in that each stator tooth is wound around, and/or both the tooth feet and the tooth heads are wound around.

Furthermore, it is advantageous if a coil in each case surrounds two tooth heads of adjacent teeth, and in each case one tooth foot is surrounded by a further coil. In this case, it has been found to be expedient if the stator teeth are designed in such a manner that the coils around the tooth feet and the coils around the tooth heads have similar parameters to, for example, a similar flux chain.

In a further advantageous embodiment of the invention, only combined teeth are located on the stator circumference.

A further variant of the invention consists in that coils, through which current flows for one phase at the same time, of adjacent teeth are wound in opposite senses.

The capability to wind the stator according to the invention can be enhanced in that stator teeth with a first and a second geometric shape are arranged alternately on the stator circumference, such that asymmetric slots are formed between the stator teeth. In this case, it has also been proven advantageous for the tooth feet on one of the two geometric shapes not to have coils wound around them.

A further advantageous embodiment of the invention consists in that all the sections of the winding are wound and are symmetrical both on the tooth feet and on the tooth heads; in this case, all the coils are wound in the same sense on the stator heads and the stator feet.

Exemplary embodiments of the invention will be described in principle in the following text, with reference to the drawings.

DETAILED DESCRIPTION

Figure 1:
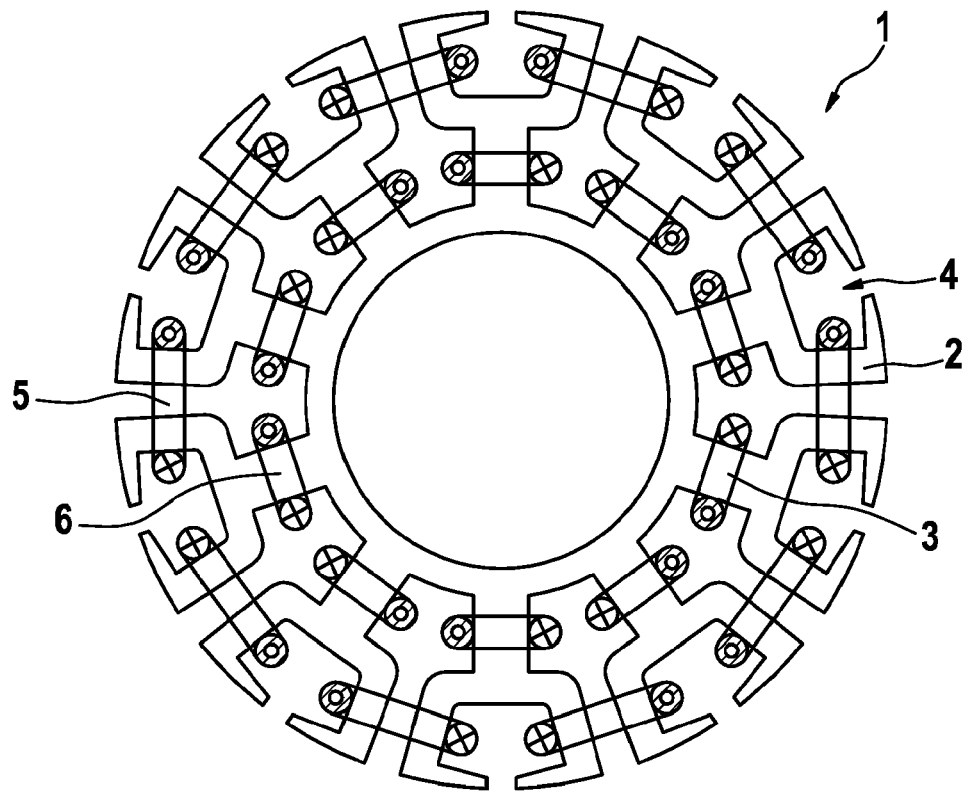
FIG. 1 shows a schematic illustration of a first embodiment of the stator according to the invention.
Figure 2:
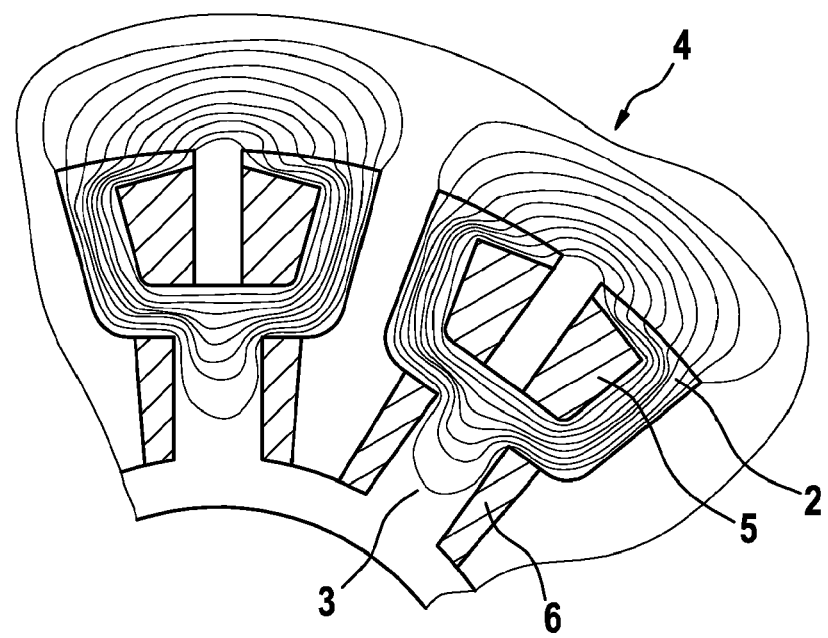
FIG. 2 shows an illustration of the flux paths on the basis of the magnetic lines of force in the situation in which current is flowing through the outer coils 5.
Figure 3:
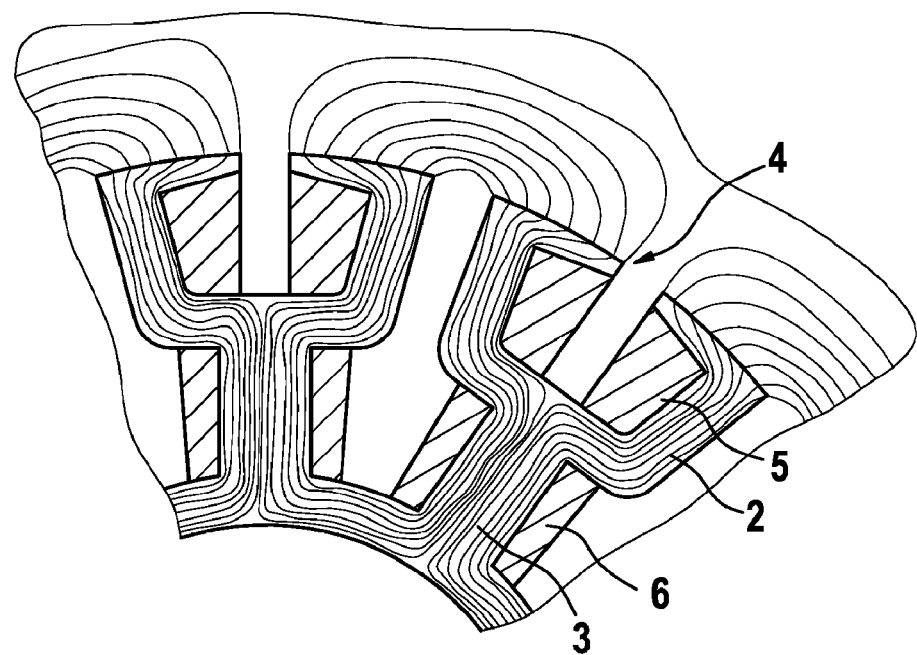
FIG. 3 shows an illustration of the flux paths on the basis of magnetic lines of force in the situation in which current is flowing through the inner coils 6.

FIG. 1 shows a schematic illustration of a first embodiment of the stator 1 according to the invention. In this case, on its outer circumference, the stator 1 has the combined stator teeth 4' which themselves each comprise two tooth heads 2 and one tooth foot 3. As can be seen from FIG. 1, the illustrated blank for the stator 1 forms a comparable stator tooth in the air gap both for the flux of the inner coils 6 and for the flux on the outer coils 5. In this case, each winding of the coils 5 and 6 results in flux flowing directly through that part of the stator which it surrounds. In this case, it is possible to compensate for any minor differences which occur in the flux chain (i.e., the flux linkage) between inner coils 6 and outer coils 5 by the number of turns. It is also advantageous to choose the geometry of the stator 1 such that the magnetic reluctance of the upper flux path differs only slightly from the magnetic relucance of the lower flux path via the tooth foot 3 and the inner yoke. The expression the upper flux path means that magnetic flux path which results when current is passed through the outer coils 5. Correspondingly, the lower flux path means that magnetic flux path which results when current is passed through the inner coils 6. FIGS. 2 and 3 illustrate the corresponding flux paths on the basis of the magnetic lines of force. In this case, FIG. 2 shows the situation in which current is being passed through the outer coils 5, while FIG. 3 shows the situation in which current is being passed through the inner coils 6.

Furthermore, it is clear from the above FIGS. 1 to 3 that the geometric shape of the stator 1 according to the invention leads to a simple stator geometry in which there is no need for auxiliary teeth, which would restrict the winding area. Auxiliary teeth such as these would have the disadvantage that, on the one hand, just by their presence, they would restrict the winding area available and, on the other hand, they would reduce the proportion of the air gap covered with laminate. This is a result of the greater number of slots, which have a minimum width because of the winding technique. As the number of slots increases, this is taken from the laminate, irrespective of whether the slots are produced by auxiliary teeth or main teeth. Configuration of the stator teeth according to the invention with just two tooth heads 2 also has a similar effect As can also be seen from FIG. 1, the coils of one phase through which current is passed at the same time, and the associated opposing phase, are always wound in opposite senses with respect to the coil of the adjacent stator tooth. This effect can also alternatively be achieved by the coils 5 and 6 being wound in the same sense and by passing current through the appropriately chosen circuitry of the coils 5 and 6 in opposite senses. The windings shown in FIG. 2 contain, in the case of an M4 circuit, layers for the forward phase and return phase, and they are therefore in the form of at least two layers. This can be dispensed with in the case of a 2H circuit since, in this case, no wound opposing phase is required. Good winding matching capabilities can be achieved in that the windings can be distributed both in the inner and in the outer area of the stator 1; this allows tooth-internal parallel circuits with time-consuming attachment, movement and laying processes to other winding positions to be effectively suppressed.

In the case of a simple winding (without an opposing phase), the same arrangement can also be operated with the 2H circuit.

Figure 4:
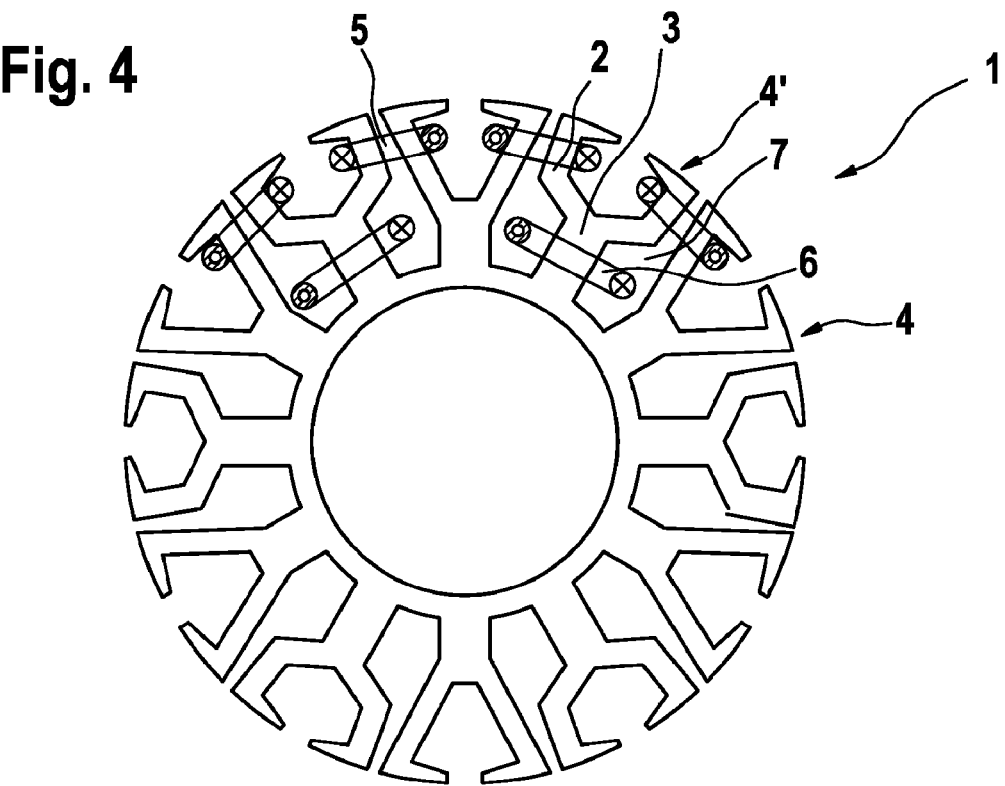
FIG. 4 shows a variant for the geometry of the stator according to the invention, in which the shape and arrangement of the stator teeth has been optimized for winding capability.

FIG. 4 shows a variant of the geometry of the stator 1 according to the invention in which the shape and arrangement of the stator teeth 4 has been optimized to improve the winding capability using the flyer winding technique, and thus to reduce the cycle time for winding. The geometry of the stator teeth 4 is in this case chosen such that differently shaped stator teeth 4 and 4' in each case alternate on the circumference of the stator 1. In the present exemplary embodiment, only every alternate stator tooth is provided with an inner coil 6. This inner coil 6 is formed with approximately twice the number of turns as the outer coil 5. The stator teeth 4, which are illustrated in FIG. 4 and are approximately triangular in the area of the tooth head 2, no longer have an inner coil 6 wound around them in the area of their tooth foot 3. The asymmetry, which results from the alternately different geometry of the stator teeth 4 and 4', of the slots 7 which are formed between the stator teeth 4 and 4' results in particular in that the inner coils 6 can be wound well around the tooth feet 3 of the stator teeth 4' with the tooth head 2, which is not approximately triangular, by using the said flyer winding technique. The geometry chosen for the slot 7 is distinguished in that, seen from the circumference of the stator 1, there is no undercut outwards from the stator tooth 4' whose tooth foot 3 is wound around.

The winding of the outer coils 5 is carried out without any change, as in the case of the stator geometry described in FIG. 1, with the same tooth and slot geometry.

Figure 5:
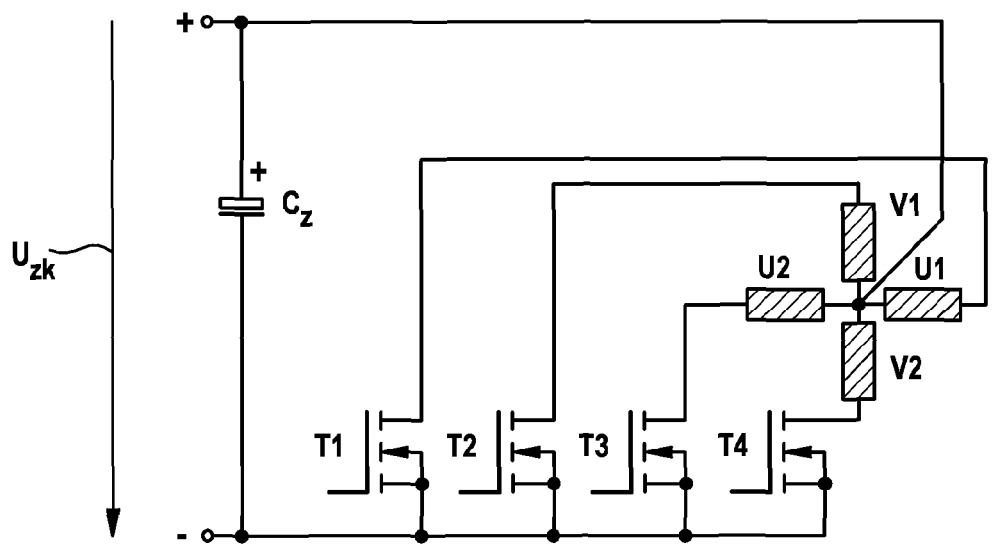
FIG. 5 shows an M4 circuit for driving the stator according to the invention.

In this case as well, the number of turns per slot 7 and the sum of the fluxes produced thereby are critical for the motor performance parameters. In the case of the stator geometry shown in FIG. 1, the inner coil 6 is always wound, and has current passed through it, in the alternating winding sense. The fluxes passing through the inner coils, which are located in the same slot 7, of adjacent stator teeth 4 are thus added. This is the result of the stator geometry shown in FIG. 4. The inner coils 5 are all formed in the same sense (still with 2 layers for the forward phase and the opposing phase), as a result of which there is no change in the fluxes passing through the slots, when seen from the stator circumference, see FIGS. 1 and 4. The described stator geometry in conjunction with the winding described above can be driven in particular by a so-called M4 circuit, as illustrated in FIG. 5. In this case, for example, the inner coils 6 would correspond to the phase U1 and the opposing phase U2, the outer coils 5 accordingly to the phases V1 and V2. The different current-flow directions are in this case achieved by the opposite winding sense of the forward phase and opposing phase.

Figure 6:
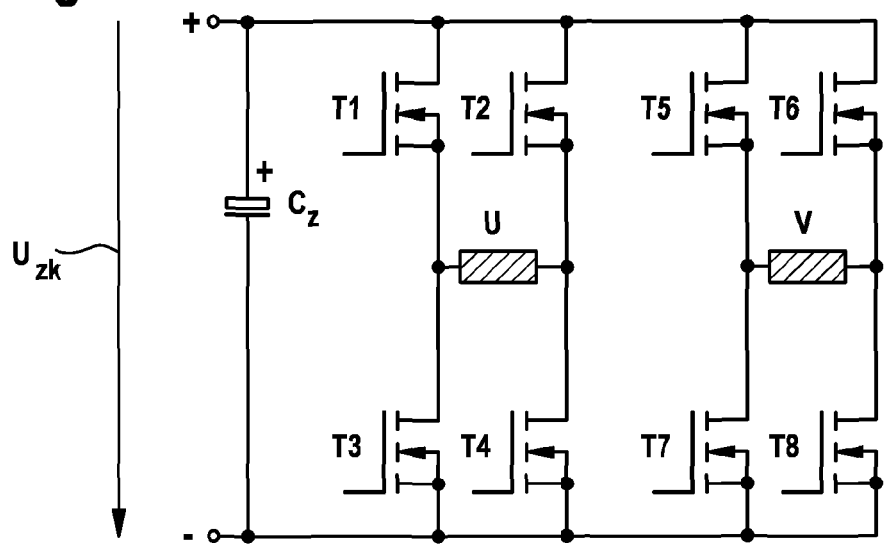
FIG. 6 shows a 2H circuit for driving the stator according to the invention.

With a simple winding (without an opposing phase), the same arrangement can also be operated using the 2H circuit illustrated in FIG. 6. In this case, for example, the inner windings would correspond to the phase U, and the outer windings to the phase V. The different current-flow directions are possible because of the full-bridge circuit; there is no need for a wound opposing phase, as in the case of the M4 circuit, with an arrangement which is otherwise identical.

FIGS. 5 and 6 show the circuitry embodiments under consideration for motors with two winding sections. FIG. 5 shows the neutral-point circuit, with two winding sections, each with a forward phase and an opposing phase, as a result of which this circuit is also referred to as an M4 circuit. FIG. 6 shows the circuit with two full bridges or H-bridges, without opposing phases provided in the copper.

Figure 7:
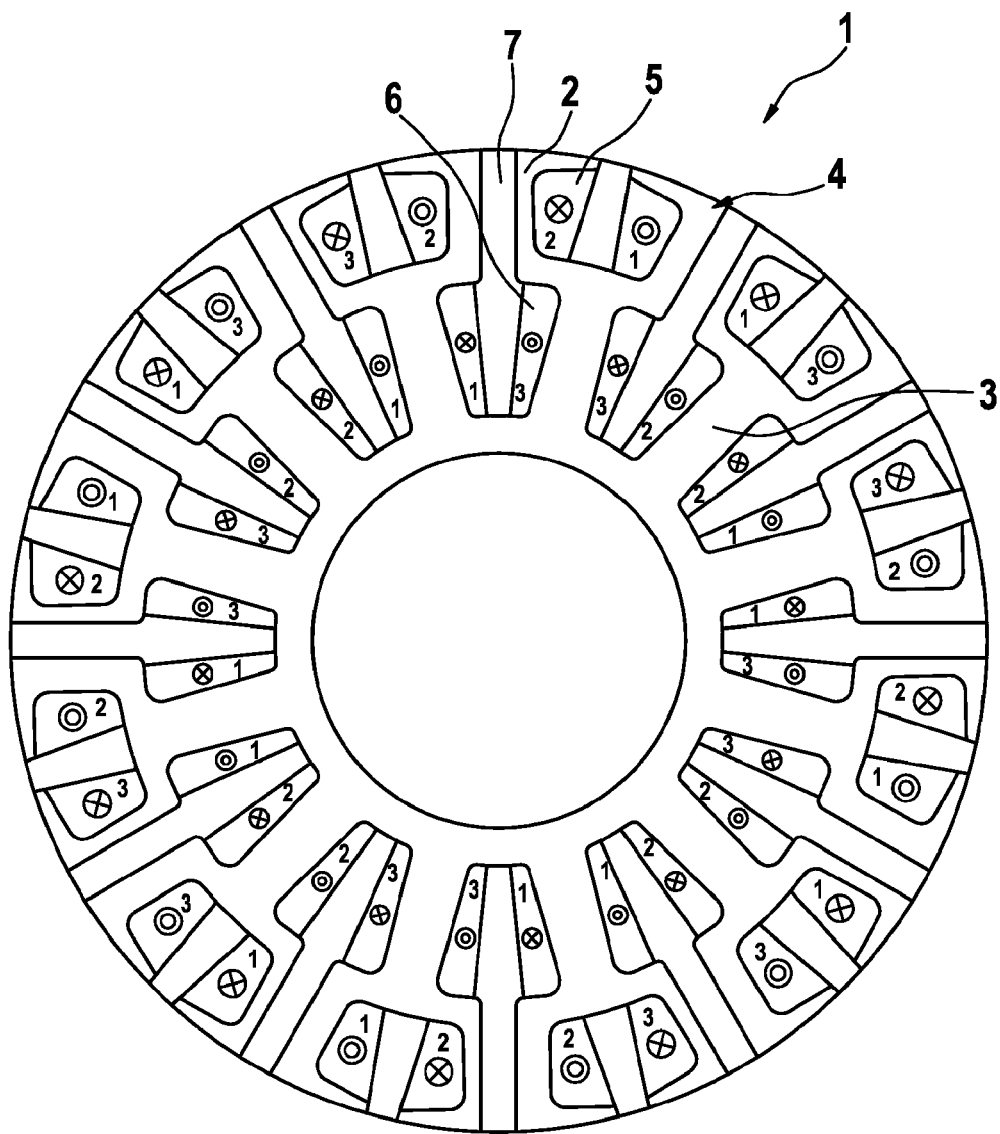
FIG. 7 shows a variant of the winding of the stator according to the invention for polyphase electric motors.

FIG. 7 shows a variant relating to the winding of the stator according to the invention, by means of which the advantages of the solution according to the invention can be transferred to polyphase electric motors.

In this embodiment as well, one major advantage of the invention is the effective doubling of the number of teeth in the air gap, while only half of the stator teeth 4 in the air gap are also effectively passed as a stator tooth 4 into the area of the slot 7 facing the stator axis. In contrast to the stator geometry shown in FIG. 1 and FIG. 4, the stator geometry according to the embodiment shown in FIG. 7 is matched to the requirements for a total of N phases. Furthermore, different slot/pole-number ratios offer advantages with regard to the cogging torque and the noise that is created which, in the case of a two-phase motor, must be avoided by increased pole skewing, which the better power density partially compensates for again. In the present example as well, the distributed winding advantageously results in smaller end windings, that is to say small unused components of the coils. As in the case of a permanent-magnet EC motor, the number of poles is chosen to be twice the number of teeth.

The major difference with respect to the embodiments described above is that, in the example shown in FIG. 7, all three winding sections, which are annotated with the letters a-c, are each distributed between inner coils 6 and outer coils 7 on the outside. As in the case of the examples shown in FIGS. 1 and 4 as well, the windings are in this case also in the form of single-tooth windings, and the end winding is in each case closed between the areas of the slots 7 annotated with the same letters a-c via the respective stator teeth 4. Furthermore, all the windings are wound in the same sense. With appropriate circuitry, this offers the capability to avoid asymmetries which occur between the inner phase and the outer phase in the case of a two-phase motor with a stator 1 as shown in FIG. 1 and FIG. 4.

In the situation illustrated in FIG. 7, as well, attention must be paid to cogging torque optimization to the fact that the magnetic reluctance of the upper flux path differs only to a small extent from the magnetic reluctance of the lower flux path via the tooth foot and the inner yoke.

Since the different numbers of poles in the three-winding-section machine with the stator 1 as illustrated in FIG. 7 also result in different flux paths, the cross section of the tooth foot 3 can be reduced somewhat in comparison to having to be increased as in the case of the examples described in FIGS. 1 and 3.

Figure 8:
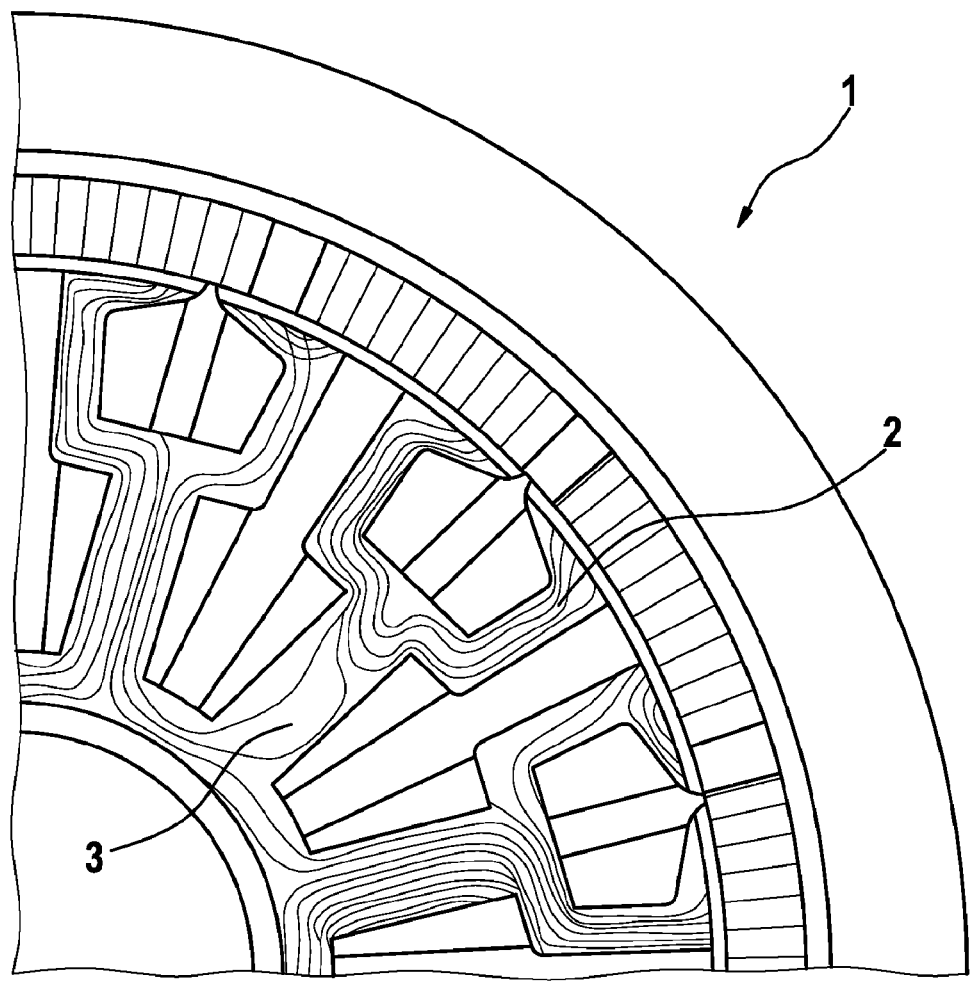
FIG. 8 shows the flux paths which result in the case of the embodiment illustrated in FIG. 7.

FIG. 8 shows the flux paths which occur with the embodiment illustrated in FIG. 7. In the present case, the flux from two tooth heads is not added in the tooth foot 3, as in the case of the two-phase machine. Either the flux follows only the upper flux path as can be seen in the central stator tooth in FIG. 8, or it is closed via a tooth head 3 and the inner yoke to the adjacent tooth. However, it is not collected in the air gap over two complete tooth heads since the magnetic angle is less than the coil/tooth angle. For this reason, the tooth foot 3 is not subject to high flux peaks. The simple stator geometry illustrated in FIGS. 1 and 4 otherwise, in principle, remains unchanged. For a total of N phases, the number of stator teeth 4 should be divided by N, as shown in this case, by way of example, for N=3. The number of poles is chosen as in the case of a traditional permanent-magnet machine, with one combined stator tooth representing two conventional teeth.

The invention claimed is:

1. A stator (1) for an electric drive motor having a number of stator teeth which are separated by slots, with a multiple-section winding being wound around stator teeth and with one section comprising a plurality of coils (5, 6) and with individual coils (5, 6) each surrounding a plurality or stator teeth, and with a plurality of stator teeth preferably being combined at the level of their tooth neck to form one combined stator tooth (4) with one tooth foot (3) and a plurality of tooth heads (2), characterized in that two stator teeth are in each case combined to form one combined stator tooth (4), wherein the number of turns of the coils (6) around the tooth feet (3) and the number of turns of the coils (5) around the tooth heads (2) result in a similar flux linkage.

2. The stator (1) as claimed in claim 1, characterized in that each stator tooth (4) is wound around.

3. The stator (1) as claimed in claim 1, characterized in that both the tooth feet (3) and the tooth heads (2) are wound around.

4. The stator (1) as claimed in claim 1, characterized in that a coil (5) in each case surrounds two tooth heads (2) of adjacent stator teeth (4), and in each case one tooth foot (3) is surrounded by a further coil (6).

5. The stator (1) as claimed in claim 1, characterized in that only combined stator teeth (4) are located on the stator circumference.

6. The stator (1) as claimed in claim 1, characterized in that coils (5, 6), through which current flows for one phase at the same time, of adjacent stator teeth (4) are wound in opposite senses.

7. The stator (1) as claimed in claim 1, characterized in that all the sections of the winding are wound and are symmetrical both on the tooth feet (3) and on the tooth heads (2).

8. The stator (1) as claimed in claim 7, characterized in that all the coils (5, 6) are wound in the same sense on the tooth heads (2) and the tooth feet (3).

9. The stator (1) as claimed in claim 4, characterized in that the stator teeth are designed in such a manner that the coils (5, 6) around the tooth feet (3) and the coils (5, 6) around the tooth heads (2) have a similar flux linkage.

10. The stator (1) as claimed in claim 2, characterized in that both the tooth feet (3) and the tooth heads (2) are wound around.

11. The stator (1) as claimed in claim 10, characterized in that a coil (5) in each case surrounds two tooth heads (2) of adjacent stator teeth (4), and in each case one tooth foot (3) is surrounded by a further coil (6).

12. The stator (1) as claimed in claim 11, characterized in that the stator teeth are designed in such a manner that the coils (5, 6) around the tooth feet (3) and the coils (5, 6) around the tooth heads (2) have similar parameters to, for example, a similar flux linkage.

13. The stator (1) as claimed in claim 12, characterized in that only combined stator teeth (4) are located on the stator circumference.

14. The stator (1) as claimed in claim 13, characterized in that coils (5, 6), through which current flows for one phase at the same time, of adjacent stator teeth (4) are wound in opposite senses.

15. The stator (1) as claimed in claim 1, wherein a magnetic resistance of an upper flow path formed when coils (5) around the tooth heads (2) are energized differs only negligibly from a magnetic resistance of a lower flow path over the tooth foot (3) and an internal yoke formed when coils (6) around the tooth feet (3) are energized.

* * * * *